United States Patent
Kim

(10) Patent No.: US 11,267,373 B2
(45) Date of Patent: Mar. 8, 2022

(54) PUMPING DEVICE FOR SEAT OF VEHICLE

(71) Applicant: HYUNDAI TRANSYS INCORPORATED, Seosan-si (KR)

(72) Inventor: Won Kim, Suwon-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/903,776

(22) Filed: Jun. 17, 2020

(65) Prior Publication Data

US 2021/0001761 A1   Jan. 7, 2021

(30) Foreign Application Priority Data

Jul. 3, 2019  (KR) ........................ 10-2019-0080070

(51) Int. Cl.
| | | |
|---|---|---|
| *B60N 2/16* | (2006.01) | |
| *B60N 2/50* | (2006.01) | |
| *B60N 2/54* | (2006.01) | |
| *B60N 2/90* | (2018.01) | |

(52) U.S. Cl.
CPC ........... *B60N 2/168* (2013.01); *B60N 2/1685* (2013.01); *B60N 2/505* (2013.01); *B60N 2/165* (2013.01); *B60N 2/54* (2013.01); *B60N 2/938* (2018.02)

(58) Field of Classification Search
None
See application file for complete search history.

(56) References Cited

U.S. PATENT DOCUMENTS

| | | | | |
|---|---|---|---|---|
| 2004/0099498 | A1* | 5/2004 | Kurita ................... | B60N 2/168 192/12 B |
| 2010/0175962 | A1* | 7/2010 | Kawai ................... | F16D 47/04 192/16 |
| 2012/0279819 | A1* | 11/2012 | Kawai ................... | F16D 41/088 192/55.2 |
| 2012/0305359 | A1* | 12/2012 | Sato ...................... | F16D 41/105 192/45.001 |
| 2013/0327609 | A1* | 12/2013 | Kawai ................... | F16D 67/02 192/16 |
| 2015/0096859 | A1* | 4/2015 | Isoda ..................... | F16D 41/18 192/15 |
| 2015/0306983 | A1* | 10/2015 | Takei .................... | B60N 2/165 297/183.9 |
| 2019/0032728 | A1* | 1/2019 | Sato ...................... | F16D 41/067 |
| 2019/0047444 | A1* | 2/2019 | Sato ...................... | F16D 41/10 |
| 2019/0210489 | A1* | 7/2019 | Sato ...................... | A47C 7/02 |
| 2019/0210490 | A1* | 7/2019 | Sato ...................... | B60N 2/10 |
| 2019/0210491 | A1* | 7/2019 | Kitayama .............. | F16D 41/02 |

FOREIGN PATENT DOCUMENTS

| | | | | |
|---|---|---|---|---|
| FR | 2375005 | * | 7/1978 | ............. F16D 41/18 |
| JP | 2008249020 | * | 10/2008 | ........... F16D 41/066 |
| KR | 10-1294472 B1 | | 8/2013 | |
| KR | 10-1683428 B1 | | 12/2016 | |
| KR | 10-2014-0085059 A | | 7/2017 | |

* cited by examiner

*Primary Examiner* — David E Allred
(74) *Attorney, Agent, or Firm* — Novick, Kim & Lee, PLLC; Jae Youn Kim; Jihun Kim

(57) ABSTRACT

A pumping device for a seat of a vehicle is proposed. In the pumping device, a spring providing a restoring force to a lever bracket is directly connected to a housing without a separate component, so that the manufacturing cost is reduced and a layout size is reduced in response to removal of the component supporting the spring.

6 Claims, 5 Drawing Sheets

PUMPING DEVICE FOR SEAT OF VEHICLE

CROSS REFERENCE TO RELATED APPLICATION

The present application claims priority to Korean Patent Application No. 10-2019-0080070, filed Jul. 3, 2019, the entire contents of which is incorporated herein for all purposes by this reference.

BACKGROUND OF THE INVENTION

Field of the Invention

The present disclosure relates generally to a pumping device for a seat of a vehicle, wherein the pumping device is configured to reduce components for restoring a lever bracket, so that the manufacturing cost thereof is reduced and a layout size thereof is reduced.

Description of the Related Art

Generally, seats such as a driver's seat and passenger seats provided in the front and back areas of a cabin of a vehicle are provided with various convenience devices for passenger comfort.

The convenience devices have functions such as a sliding function that can adjust a position of a seat by pushing and pulling forward and backward the seat according to a body shape of a passenger, and a reclining function that can adjust inclination of a seat back.

Further, in recent years, a pumping device, which has a seat lifting function, has been provided in a vehicle to adjust the height of the seat to fit to the height of a passenger.

The pumping device can have a lever unit, a clutch unit, and a brake unit. The lever unit receives a user's operating force and transmits the operating force to the clutch unit, the clutch unit transmits the input operating force to a link means of a seat, and the brake unit blocks a reversely input power to fix the locked link means.

The lever unit includes a lever bracket, which converts a vertical operating force of a handle lever provided at a side of a seat into a rotational force and transmits the rotational force to the clutch unit. Further, the pumping device may include a return part for returning the handle lever and the lever bracket to initial positions.

However, the return part for returning the lever bracket to an initial position thereof includes a spring and a spring guide supporting the spring. That is, the spring providing a restoring force to the lever bracket requires a separate fixing means, and as the spring guide is provided in the return part for this purpose, the layout size of the pumping device is increased and the manufacturing cost thereof is increased.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a pumping device for a seat of a vehicle, wherein the number of components for restoring a lever bracket are reduced to reduce the manufacturing cost of the pumping device and a layout size thereof.

In order to achieve the above objectives, according to one aspect of the present disclosure, there is provided a pumping device for a seat of a vehicle. The pumping device includes: a lever bracket configured to be rotated by an external operational force; a spring connected to the lever bracket and configured to generate an elastic force while being transformed in a circumferential direction thereof so that the lever bracket may be restored to an initial position thereof; and a housing having an outside surface on which the lever bracket and the spring may be seated and a flange protruding from the outside surface to contact with the spring to fix a position of the spring.

The spring may have a ring shape in which a partial section thereof may be cut, and opposite ends of the cut section may have bending portions, respectively, which may be bent and extended so as to be connected to the lever bracket.

The lever bracket may have a center portion that may be seated on the outside surface of the housing, an extension portion may be extended from the center portion, and the extension portion may have an open hole to which the bending portions of the spring may be coupled.

Each of the bending portions may be extended with an inclination in a direction opposite to an associated one of directions in which the opposite ends of the spring may face each other.

The open hole may be a slit extended in the circumferential direction, and rotational displacement of the lever bracket may be limited by extended length of the open hole.

An inner diameter of the spring may be larger than an outer diameter of the center portion of the lever bracket.

The flange may include a plurality of flanges, the plurality of flanges being in contact with the bending portions of the spring, respectively, and being arranged at sides opposite to directions in which the bending portions may face each other.

The housing may have a support at the outside surface thereof, the support protruding from an opposite side of the flange so as to be in contact with an outside of the spring.

As described above, the pumping device for a seat of a vehicle is configured such that the spring that provides a restoring force to the lever bracket is directly connected to the housing without a separate component. Accordingly, it is possible to reduce the manufacturing cost of the pumping device and the layout size thereof in response to the removal of the separate component for fixing the spring.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinbelow, a pumping device for a seat of a vehicle according to an exemplary embodiment of the present disclosure will be described with reference to the accompanying drawings.

Figure 1:
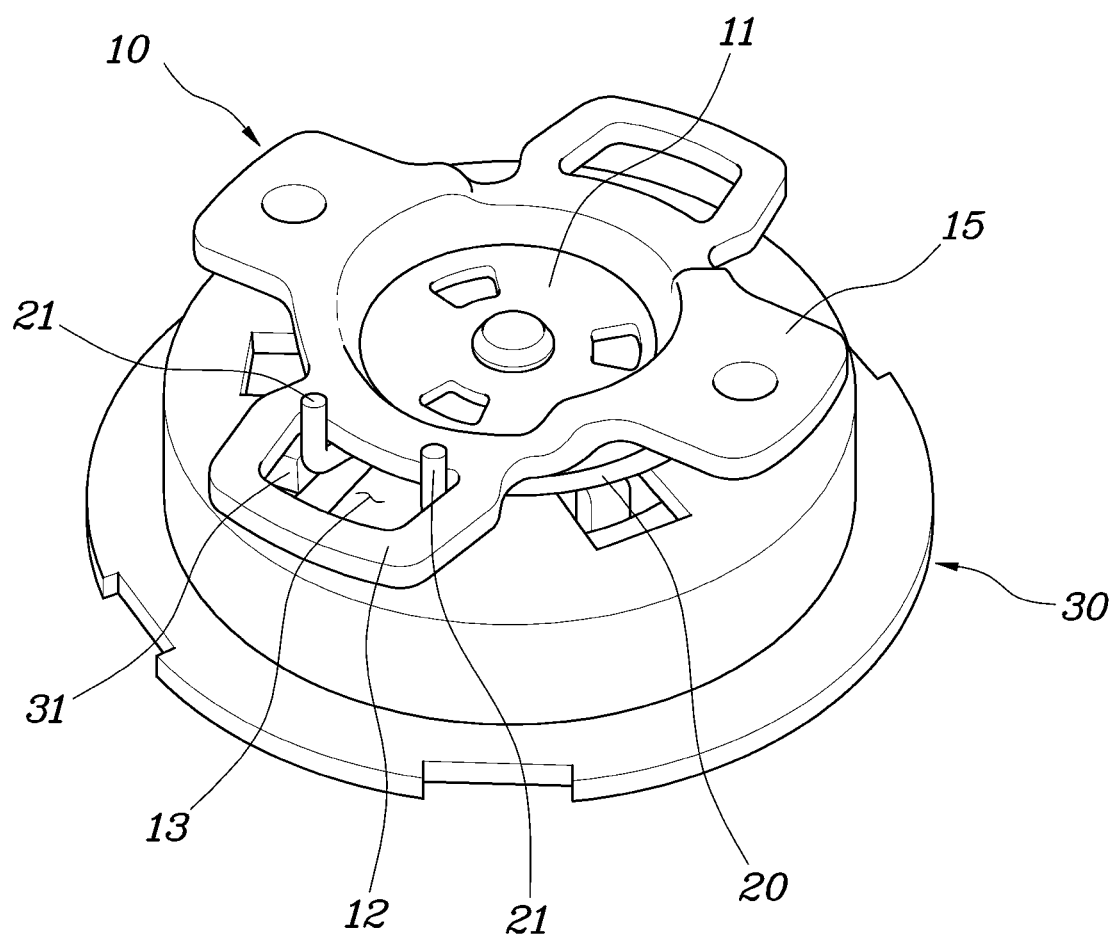
FIG. 1 is a view showing a pumping device for a seat of a vehicle according to an embodiment of the present disclosure.
Figure 5:
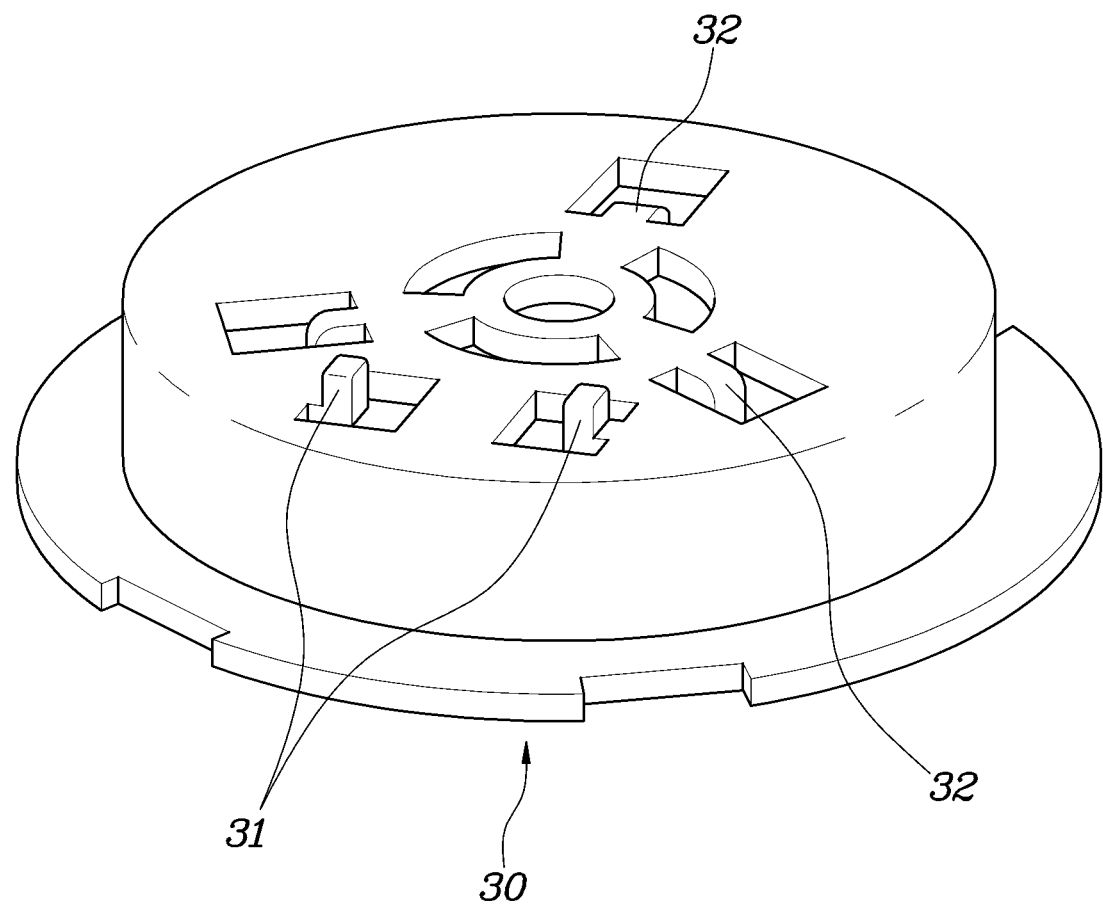
Figure 6:
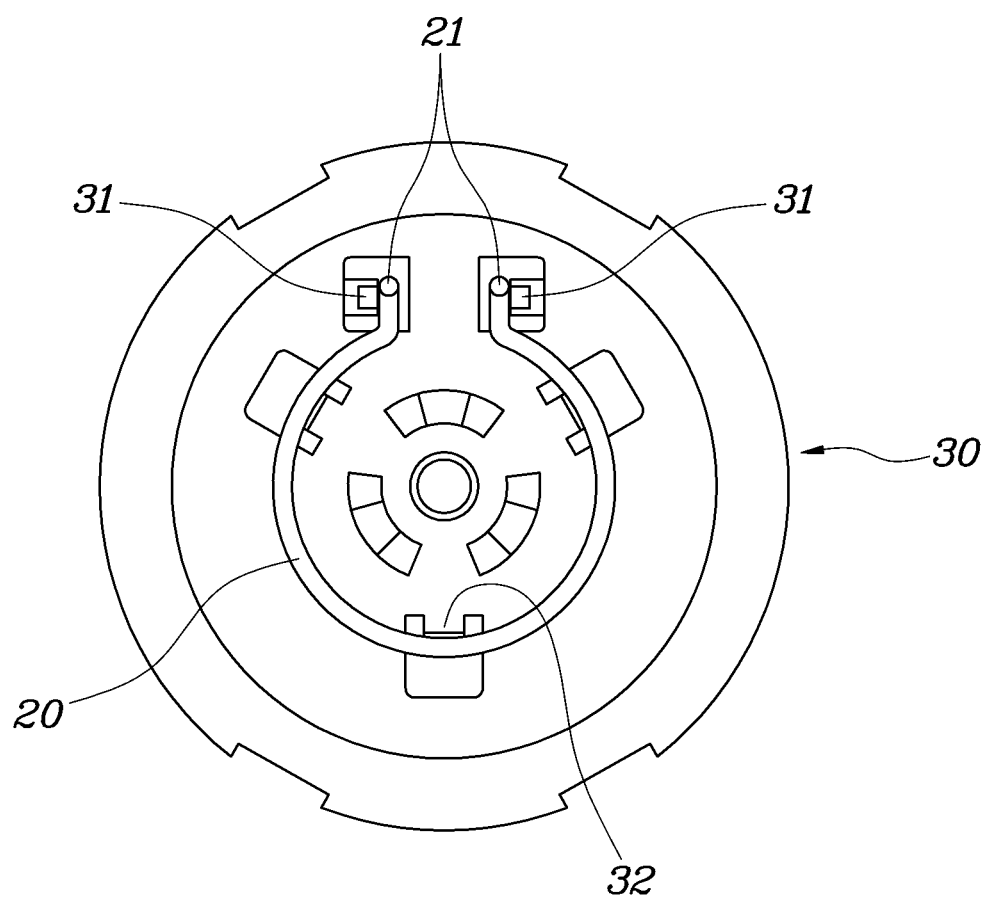
Figure 7:
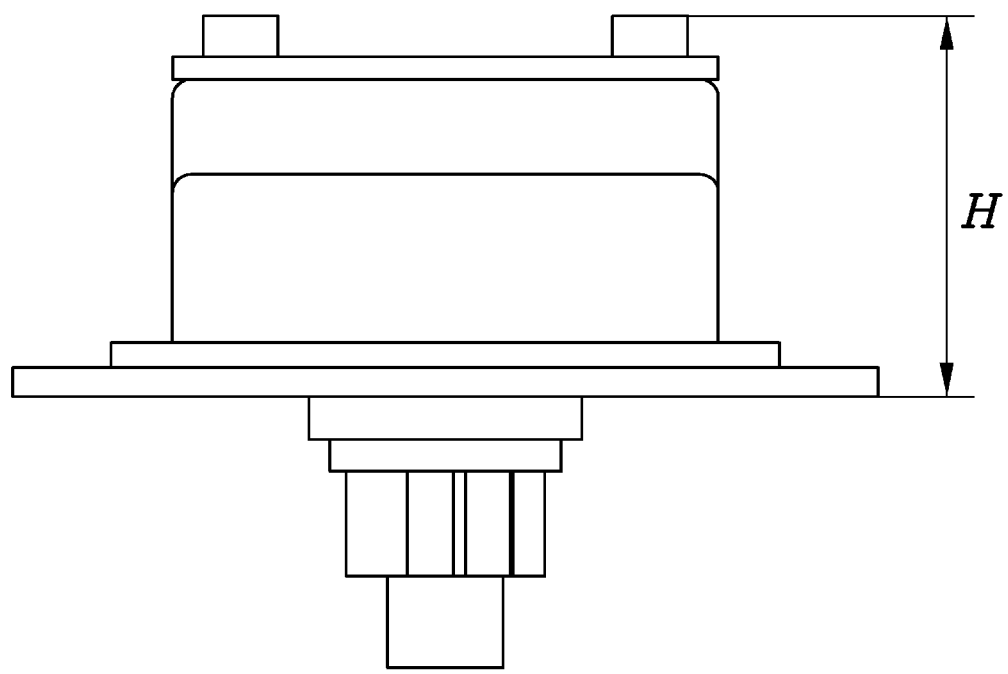
FIGS. 7 and 8 are views showing comparison between a conventional pumping device and the pumping device of the present disclosure.
Figure 8:
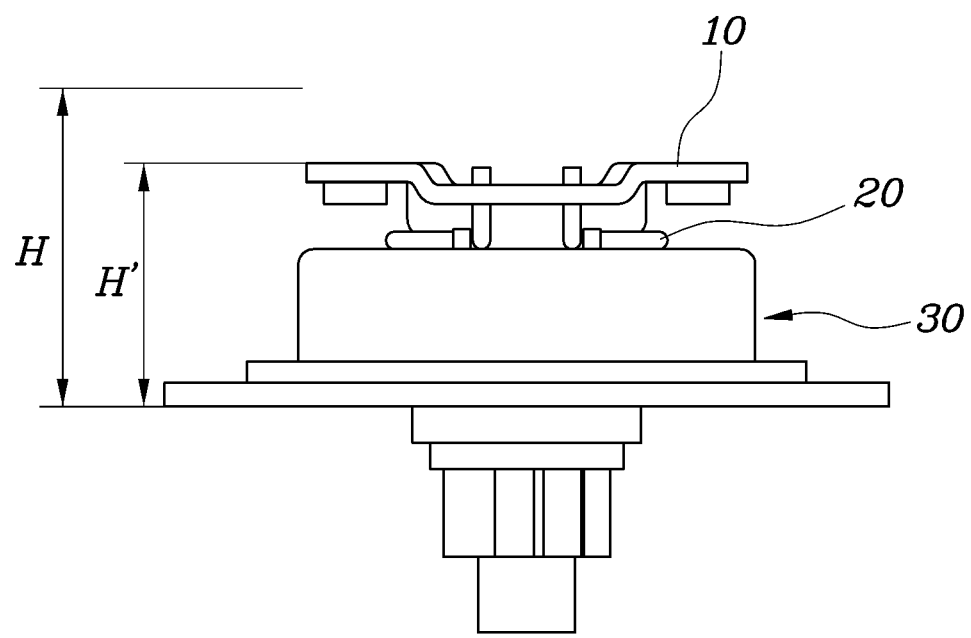

FIG. 1 is a view showing the pumping device for a seat of a vehicle according to the embodiment of the present disclosure, FIGS. 2 to 6 are views showing the pumping device for a seat of a vehicle in FIG. 1, and FIGS. 7 and 8 are views showing a comparison between a conventional pumping device and the pumping device of the present disclosure.

The present disclosure relates to the pumping device for a seat of a vehicle, and in the pumping device for a seat of a vehicle, a pumping assembly is provided in a housing 30 and the pumping assembly is configured to perform braking and clutch functions using a clutch cam (A). The clutch cam (A) of the pumping assembly is coupled to a lever bracket 10 by passing through an outside surface 30a of the housing 30 to, and the lever bracket 10 is configured to be coupled to a motor or an operational lever to be rotated.

The specific configuration of the pumping device will be further described in detail as below.

Figure 2:
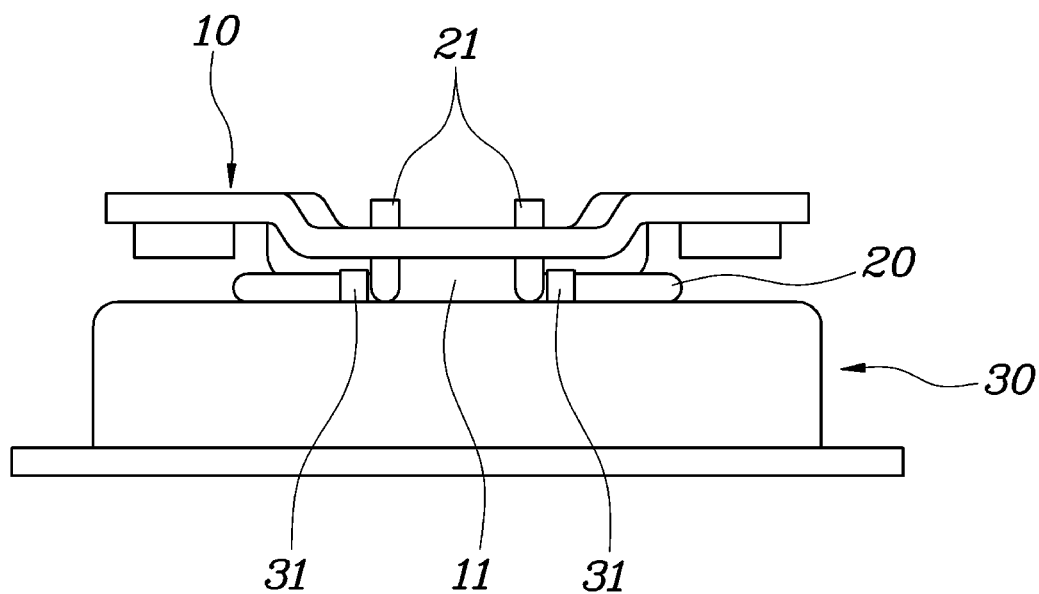
FIGS. 2 to 6 are views describing the pumping device for a seat of a vehicle in FIG. 1.
Figure 3:
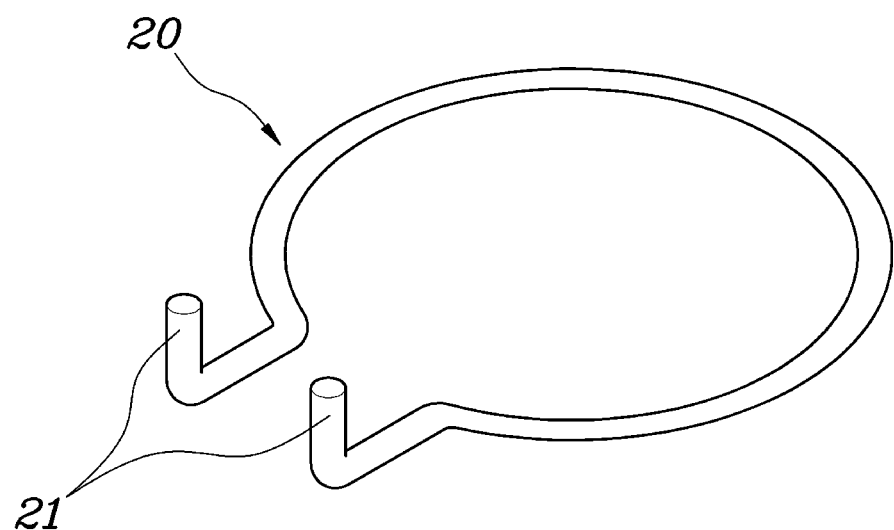

As shown in FIGS. 1 and 2, the pumping device for a seat of a vehicle according to the present disclosure includes: the lever bracket 10 rotated by an external operational force; and a spring 20 connected to the lever bracket 10 and configured to generate an elastic force while being transformed in a circumferential direction thereof to allow the lever bracket 10 to be restored to an initial position thereof; and the housing 30 having the outside surface 30a on which the lever bracket 10 and the spring 20 are seated, and having a flange 31 that is formed by protruding from the outside surface 30a to contact with the spring 20 to fix a position of the spring 20.

The lever bracket 10 receives an external operational force through the motor or the operational lever, and may have a coupling portion 15 so as to be connected to the motor or the operational lever. The housing 30 is formed in a drum shape to have an interior space, the pumping assembly that performs the braking and clutch functions of the pumping device is received in the interior space, and the clutch cam (A) of the pumping assembly passes through the outside surface 30a to be integrally coupled to the lever bracket 10. Accordingly, the lever bracket 10 is seated on the outside surface 30a of the housing 30 in a rotatable state.

In particular, the spring 20 is provided on the outside surface 30a of the housing 30, and the spring 20 is connected to the lever bracket 10 to provide the elastic force so that the lever bracket 10 is restored to the initial position thereof. The spring 20 requires a support structure to provide the elastic force to the lever bracket 10, and the flange 31 provided on the housing 30 functions as the support structure so that the position of the spring 20 is fixed as the spring 20 is in contact with the flange 31.

As the flange 31 protrudes on the outside surface 30a of the housing 30 and the spring 20 is in contact with the flange 31 to be supported, when the lever bracket 10 is rotated, the spring 20 generates the elastic force by transformation thereof in a state of being supported by the flange 31, thus providing a restoring force to the lever bracket 10.

Therefore, as the spring 20, which provides the restoring force to the lever bracket 10, is directly coupled to the housing 30 without a separate component, the manufacturing costs of the pumping device and a layout thereof are reduced in response to the removal of a component for supporting the spring 20.

Specifically with respect to the present disclosure described above, as shown in FIG. 3, the spring 20 has a ring shape in which a partial section thereof is cut, and opposite ends at the cut section have bending portions 21, respectively, which are bent and extended to be connected to the lever bracket 10.

That is, the spring 20 is formed in a 'C' shape, and the spring 20 is configured to generate an elastic force wherein opposite cut ends of the spring 20 are restored to initial positions after being separated apart from each other. The bending portions 21 are bent and extended from the opposite cut ends of the spring 20, so that as the bending portions 21 are inserted into the lever bracket 10, the spring 20 and the lever bracket 10 may be connected to each other.

Each of the bending portions 21 may be extended with an inclination in a direction opposite to an associated one of directions in which the opposite ends of the spring 20 face each other. In other words, each of the bending portions 21 can be extended, being inclined in an opposite direction to each other.

Figure 4:
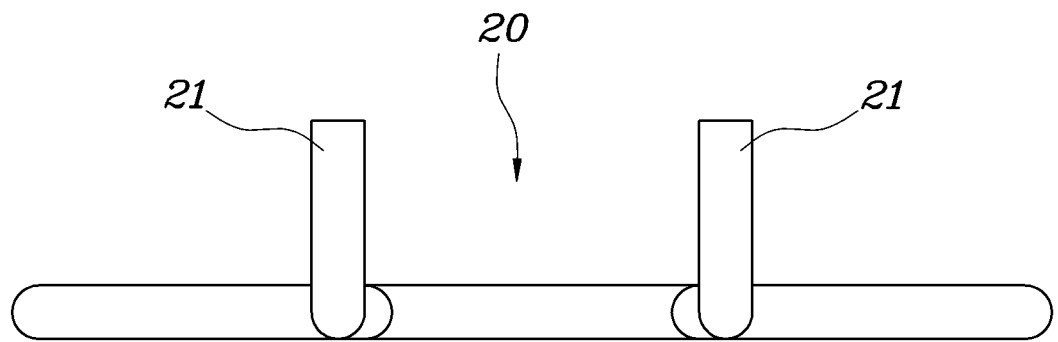

As shown in FIG. 4, as each of the bending portions 21 is extended with the predetermined-angled inclination in the direction opposite to the associated one of the directions in which the opposite ends of the spring face each other with respect to the circumferential direction of the spring 20, a rotating direction of the lever bracket 10 is guided. That is, when the lever bracket 10 is rotated, a first end of the spring 20 is moved in a state in which a second end thereof is supported, and the spring 20 is transformed to be closed, thereby generating the elastic force. Likewise, the elastic force is generated as the spring 20 is closed in the directions in which the ends thereof face each other and then is opened in directions opposite to the facing directions. Whereby each of the bending portions 21 is bent with the inclination in the direction opposite to the associated one of the directions in which the ends of the spring face each other, thus the lever bracket 10 may be smoothly rotated in a direction in which the position thereof is restored.

Further, as each of the bending portions 21 is extended with the inclination, separation thereof is prevented when the bending portions 21 are inserted in an open hole 13 of an extension portion 12, which will be described below, provided in the lever bracket 10.

Meanwhile, the lever bracket 10 has a center portion 11 seated on the outside surface 30a of the housing 30, the extension portion 12 is extended from the center portion 11, and the extension portion 12 has the open hole 13 in which the bending portions 21 of the spring 20 are inserted.

As shown in FIG. 1, the center portion 11 of the lever bracket 10 is coupled to the clutch cam (A) of the pumping assembly provided in the housing 30, and the coupling portion 15 provided for coupling the lever bracket 10 to the motor or the operational lever and the extension portion 12 provided for coupling the lever bracket 10 to the spring 20 are extended along a circumference of the center portion 11. Herein, as the extension portion 12 has the open hole 13 in which the bending portions 21 of the spring 20 are inserted, the spring 20 generates the elastic force by closed and opened motions of the spring 20 when the lever bracket 10 is rotated, while the bending portions 21 are inserted in the open hole 13 and supported by the flange 31 of the housing 30.

The open hole 13 is a slit extended in a circumferential direction of the lever bracket 10, so rotational displacement of the lever bracket 10 may be limited by extended length of the open hole 13. Therefore, as the open hole 13 is formed in a slit shape extended in the circumferential direction, the lever bracket 10 may be limitedly rotated by the extended length of the open hole 13 while being connected to the spring 20. In addition, a space in which the spring 20 may be transformed is secured as the open hole 13 is extended, so that the elastic force caused when the spring is closed may be generated 20.

Meanwhile, the spring 20 has a circular shape, and an inner diameter of the circular shape of the spring 20 may be larger than an outer diameter of the center portion 11 of the lever bracket 10. Therefore, the lever bracket 10 and the spring 20 are assembled to each other in a form in which the spring 20 surrounds an outside of the center portion 11, so that the structure is advantageous in layout. In addition, as the inner diameter of the spring 20 is larger than the outer diameter of the center portion 11 of the lever bracket 10, transformation in which the spring 20 is closed is smoothly performed, so that the restoring force may be smoothly transmitted to the lever bracket 10.

Meanwhile, as shown in FIG. 5, the flange 31 includes a plurality of flanges, and the flanges 31 are in contact with the bending portions 21 of the spring 20, respectively. In addition, the flanges 31 may be arranged at sides opposite to directions in which the bending portions 21 of the spring 20 face each other.

In the present disclosure, the spring 20 is formed in a 'C' shape, and accordingly, a plurality of bending portions 21 is provided. Thereby, the flange 31 of the housing 30 includes the plurality of flanges 31 to match with the bending portions 21 of the spring 20, so that the spring 20 may be stably supported. In addition, as the flanges 31 of the housing 30 are arranged at the sides opposite to the directions in which the bending portions 21 of the spring 20 face each other, the motion of elastically opening the spring 20 is limited, and when the lever bracket 10 is rotate, the first end of the spring 20 is moved and the second end thereof is supported by one of the flanges 31 so that the elastic force may be generated.

Meanwhile, as shown in FIG. 6, the housing 30 may have a support 32 at the outside surface 30a thereof, and the support 32 may protrude from an opposite side of the flanges 31 so as to be in contact with an outside of the spring 20.

As described above, the outside surface 30a of the housing 30 is provided with the flanges 31 and the support 32 that is positioned opposite to the flanges 31, the spring 20 seated on the outside surface 30a of the housing 30 may have a firmly fixed position thereof by being restricted by the support 32 while the bending portions 21 are fixed by the flanges 31.

As shown in FIGS. 7 and 8, when FIG. 7 showing the conventional pumping device and FIG. 8 showing the pumping device of the present disclosure are compared with each other, the present disclosure is configured such that the separate component for fixing the spring 20 is removed and the spring 20 is fixed by the housing 30, so that there is difference (H–H') that the width of the pumping device is reduced in a vertical direction.

In addition, as the separate component for fixing the spring 20 is removed, the manufacturing costs of the pumping device is reduced.

Although a preferred embodiment of the present disclosure has been described for illustrative purposes, those skilled in the art will appreciate that various modifications, additions and substitutions are possible, without departing from the scope and spirit of the present disclosure as disclosed in the accompanying claims.

What is claimed is:

1. A pumping device for a seat of a vehicle, the pumping device comprising:
    a lever bracket configured to be rotated by an external operational force;
    a spring connected to the lever bracket and configured to generate an elastic force, wherein the spring is configured to be transformed in a circumferential direction thereof so that the lever bracket can be restored to an initial position thereof; and
    a housing having an outside surface on which the lever bracket and the spring are seated and a flange protruding from the outside surface to contact with the spring to fix a position of the spring,
    wherein the spring has a ring shape in which a partial section thereof is cut, and opposite ends of the cut section have bending portions, respectively, which are upward bent and extended in a direction perpendicular to the circumferential direction so as to be connected to the lever bracket, and
    wherein the lever bracket has a center portion that is seated on the outside surface of the housing, and an extension portion extended from the center portion, wherein the extension portion has an open hole to which the bending portions of the spring are coupled, the open hole penetrating from top to bottom of the extension portion.

2. The pumping device of claim 1, wherein each of the bending portions is extended with an inclination in a direction opposite to an associated one of directions in which the opposite ends of the spring face each other.

3. The pumping device of claim 1, wherein the open hole is a slit extended in the circumferential direction, and rotational displacement of the lever bracket is limited by an extended length of the open hole.

4. The pumping device of claim 1, wherein an inner diameter of the spring is larger than an outer diameter of the center portion of the lever bracket.

5. The pumping device of claim 1, wherein the flange is one of a plurality of flanges, the plurality of flanges being in contact with the bending portions of the spring, respectively, and being arranged opposite to directions in which the bending portions face each other.

6. The pumping device of claim 1, wherein the housing has a support at the outside surface thereof, the support protruding from the outside surface so as to be in contact with an outside of the spring.

* * * * *